US012624135B2

(12) United States Patent
Lee et al.

(10) Patent No.: US 12,624,135 B2
(45) Date of Patent: May 12, 2026

(54) METHOD FOR PREPARING SUPER ABSORBENT POLYMER

(71) Applicant: LG CHEM, LTD., Seoul (KR)

(72) Inventors: Serin Lee, Daejeon (KR); Seung Hun Yang, Daejeon (KR); Ju Eun Kim, Daejeon (KR); Joonil Cho, Daejeon (KR); Hoyong Lee, Daejeon (KR); Jungmin Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 684 days.

(21) Appl. No.: 18/016,249

(22) PCT Filed: Jan. 28, 2022

(86) PCT No.: PCT/KR2022/001592
§ 371 (c)(1),
(2) Date: Jan. 13, 2023

(87) PCT Pub. No.: WO2022/169227
PCT Pub. Date: Aug. 11, 2022

(65) Prior Publication Data
US 2023/0287155 A1      Sep. 14, 2023

(30) Foreign Application Priority Data

Feb. 3, 2021    (KR) ........................ 10-2021-0015453
Jan. 27, 2022    (KR) ........................ 10-2022-0012653

(51) Int. Cl.
*C08F 20/06*      (2006.01)
*C08J 3/075*      (2006.01)

(52) U.S. Cl.
CPC .............. *C08F 20/06* (2013.01); *C08J 3/075* (2013.01); *C08J 2333/08* (2013.01)

(58) Field of Classification Search
CPC ..... C08F 20/06; C08F 2/10; C08F 2/44; C08J 3/075; C08J 2333/08; C08J 2333/02; C08J 3/12; C08L 101/14; C08L 33/08; A61L 15/24; A61L 15/60; A61F 13/53
See application file for complete search history.

(56) References Cited

U.S. PATENT DOCUMENTS

| | | | |
|---|---|---|---|
| 4,861,849 A | 8/1989 | Buchholz | |
| 2005/0085604 A1 | 4/2005 | Handa et al. | |
| 2007/0207924 A1 | 9/2007 | Keuchi et al. | |
| 2009/0118432 A1* | 5/2009 | Fukudome | C08K 5/175 |
| | | | 525/329.9 |
| 2011/0034603 A1 | 2/2011 | Fujino et al. | |
| 2012/0010372 A1 | 1/2012 | Fujino et al. | |
| 2012/0202951 A1 | 8/2012 | Gartner et al. | |
| 2013/0264517 A1 | 10/2013 | Matsumoto et al. | |
| 2015/0259494 A1 | 9/2015 | Takaai et al. | |
| 2016/0083532 A1* | 3/2016 | Wagner | C08J 9/122 |
| | | | 525/328.8 |

| | | | |
|---|---|---|---|
| 2016/0272745 A1* | 9/2016 | Daniel | A61L 15/22 |
| 2017/0267793 A1 | 9/2017 | Mura et al. | |
| 2017/0320983 A1 | 11/2017 | Daniel et al. | |
| 2018/0071714 A1 | 3/2018 | Torii et al. | |
| 2018/0318792 A1 | 11/2018 | Miyajima et al. | |
| 2019/0111411 A1 | 4/2019 | Torii et al. | |
| 2019/0125921 A1 | 5/2019 | Kimura et al. | |

FOREIGN PATENT DOCUMENTS

| | | | | |
|---|---|---|---|---|
| EP | 0409136 A2 | 1/1991 | | |
| EP | 2395029 A1 | 12/2011 | | |
| EP | 2589613 A1 | 5/2013 | | |
| EP | 3279239 A1 | 2/2018 | | |
| JP | H01-234402 A | 9/1989 | | |
| JP | H03-143903 A | 6/1991 | | |
| JP | H11-335574 A | 12/1999 | | |
| JP | 2000-38407 A | 2/2000 | | |
| JP | 2001-226303 A | 8/2001 | | |
| JP | 2003-206305 A | 7/2003 | | |
| JP | 2006-055833 A | 3/2006 | | |
| JP | 2006-176570 A | 7/2006 | | |
| JP | 2009-155651 A | 7/2009 | | |
| JP | 5099899 B2 | 12/2012 | | |
| JP | 2016-112474 A | 6/2016 | | |
| JP | 2016-112475 A | 6/2016 | | |
| KR | 10-2012-0081113 A | 7/2012 | | |
| KR | 10-1245467 B1 | 3/2013 | | |
| KR | 10-2016-0035569 A | 3/2016 | | |
| KR | 10-2018-0063234 A | 6/2018 | | |
| KR | 10-2018-0128463 A | 12/2018 | | |
| KR | 10-2165459 B1 | 10/2020 | | |
| WO | WO-9305080 A1 * | 3/1993 | .............. | C08F 6/00 |
| WO | 2005/097313 A1 | 10/2005 | | |
| WO | 2009/130915 A1 | 10/2009 | | |
| WO | 2011/040530 A1 | 4/2011 | | |
| WO | 2011/120746 A1 | 10/2011 | | |

(Continued)

OTHER PUBLICATIONS

Third Party of Observation issued on Jun. 2, 2023 for corresponding International Patent Application No. PCT/KR2022/001592.
Database WPI Week 2020030, Thomson Scientific, London, GB; AN 2020-23696Y, 2000, XP002810649.
Database WPI Week 200040, Thomson Scientific, London, GB; AN 2000-454333, 2000, XP002810650.
Extended European Search Report dated Dec. 19, 2023, issued in corresponding European Patent Application No. 22749977.9.
International Search Report (with translation) and Written Opinion dated May 13, 2022, issued in corresponding International Patent Application No. PCT/KR2022/001592.
Reinhold Schwalm, "UV Coatings Basics, Recent Developments and New Applications," Elsevier, p. 115, (2006).
Office Action dated Dec. 23, 2025, issued in corresponding European Patent Application No. 22 749 977.9.

*Primary Examiner* — Alicia Bland
(74) *Attorney, Agent, or Firm* — Morgan, Lewis & Bockius LLP

(57) ABSTRACT

This invention relates to a method for preparing super absorbent polymer, and more specifically, a method for preparing super absorbent polymer that can more productively prepare super absorbent polymer having excellent absorption properties and optimum gel strength at the same time, by using a specific polymerization initiator and chelating agent in combination during a crosslinking polymerization step.

7 Claims, No Drawings

(56)     References Cited

FOREIGN PATENT DOCUMENTS

| WO | 2014/079710 | A1 | 5/2014 |
| WO | 2016/088848 | A1 | 6/2016 |
| WO | 2020/059871 | A1 | 3/2020 |

* cited by examiner

METHOD FOR PREPARING SUPER ABSORBENT POLYMER

CROSS-REFERENCE TO RELATED APPLICATION

This application claims the benefit of Korean Patent Application No. 10-2021-0015453 filed on Feb. 3, 2021 and Korean Patent Application No. 10-2022-0012653 filed on Jan. 27, 2022 with the Korean Intellectual Property Office, the disclosures of which are herein incorporated by reference in their entirety.

Technical Field

This invention relates to a method for preparing super absorbent polymer, and more specifically, a method for preparing super absorbent polymer that can more productively prepare super absorbent polymer having excellent absorption performance and optimum gel strength at the same time, by using a specific polymerization initiator and chelating agent in combination during a crosslinking polymerization step.

Background Art

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as water-holding material for soil, water stop material for civil engineering and architecture, sheets for raising seedling, freshness preservatives in the field of food circulation, fomentation material, and the like, besides paper diapers for children.

In most cases, such super absorbent polymer is widely used in the field of hygienic products such as diapers or sanitary pads, and the like, and for such purpose, it should exhibit high absorption force for moisture, and the like, and it should exhibit excellent absorption under pressure such that moisture may not be discharged even under external pressure, and excellent permeability such that a shape may be maintained even if swollen by absorption of water.

In addition, when the super absorbent polymer is included in hygienic products such as a diaper, it should diffuse urine, and the like as widely as possible, even under pressure by body weight of a user. Thereby, super absorbent polymer particles included in the entire area of an absorption layer of a hygienic product may be wholly applied, thus further improving absorption performance and absorption speed of the hygienic product. And, due to such diffusion under pressure, rewet property of a diaper may be further improved such that rewet of urine, and the like once absorbed in super absorbent polymer may be prevented, and furthermore, leakage inhibition property of a diaper may be improved.

Previously, there have been attempts to widely diffuse urine, and the like, by modifying the design of a hygienic product such as a diaper. For example, there have been attempts to improve diffusion property of urine, and the like, by introducing an ADL (Acquisition Distribution Layer) in a hygienic product, or applying an absorption channel. However, improvement in diffusion property by such design change of hygienic products was not sufficient.

Meanwhile, in order to improve absorption-related properties such as absorption power or absorption speed of super absorbent polymer, various post-treatment processes such as surface crosslinking, foaming, and the like are conducted, or various additives are used, but in such a process, crosslinking density of polymer may be lowered, and thus, sufficient gel strength may not be realized, and additives may be detached, and thus, when applied for a product, wearing comfort of a user may be degraded such as occurrence of skin rash.

Therefore, there is a demand for studies on the preparation of super absorbent polymer that not only maintains excellent absorption properties, but also realizes optimum gel strength.

DISCLOSURE

Technical Problem

It is an object of the invention to provide a method for preparing super absorbent polymer that can more productively prepare super absorbent polymer having excellent absorption performance and optimum gel strength at the same time, by using a specific polymerization initiator and chelating agent in combination in the crosslinking polymerization step during the preparation process.

Technical Solution

In order to achieve the object, there is provided a method for preparing super absorbent polymer comprising steps of:
conducting crosslinking polymerization of water soluble ethylenically unsaturated monomers having acid groups of which at least a part are neutralized and an internal crosslinking agent, in the presence of an azo-based polymerization initiator and diethylenetriamine pentaacetic acid, to obtain hydrogel polymer; and
drying, grinding and classifying the hydrogel polymer to form base resin powder,
wherein the azo-based polymerization initiator and diethylenetriamine pentaacetic acid are included at the weight ratio of 1:2 to 1:10.

Effect of the Invention

According to the invention, there is provided a method for preparing super absorbent polymer that can more productively prepare super absorbent polymer having excellent absorption performance and optimum gel strength at the same time, by realizing optimum crosslinking density with a novel crosslink structure.

BEST MODE FOR CARRYING OUT THE INVENTION

The terms used herein are only to explain specific embodiments, and are not intended to limit the invention.

A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

The terms "first", "second", "third", and the like are used to explain various constructional elements, and these terms are used only to distinguish one construction element from the other constructional elements.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

As used herein, the term "polymer" means a polymerized state of water soluble ethylenically unsaturated monomers, and it may include those of all moisture content ranges or particle diameter ranges. Among the polymers, those after polymerized and before dried, and having a moisture content of about 40 wt % or more may be referred to as hydrogel polymer, and particles obtained by grinding and drying of such hydrogel polymer may be referred to as crosslinked polymer.

And, the term "crosslinked polymer" means those obtained by crosslinking polymerization of the water soluble ethylenically unsaturated monomers having acid groups of which at least a part are neutralized, and the "base resin powder" means material comprising such crosslinked polymer.

And, the term "super absorbent polymer" means a crosslinked polymer wherein water soluble ethylenically unsaturated monomers having acid groups, of which at least a part are neutralized, are polymerized, or base resin powder consisting of super absorbent polymer particles obtained by grinding of the crosslinked polymer, or is used to include the crosslinked polymer or base resin made appropriate for productization through additional process, for example, surface crosslinking, fines reassembly, drying, grinding, classification, and the like.

(A Method for Preparing Super Absorbent Polymer)

The method for preparing super absorbent polymer according to one embodiment of the invention comprises steps of: conducting crosslinking polymerization of water soluble ethylenically unsaturated monomers having acid groups of which at least a part are neutralized and an internal crosslinking agent, in the presence of an azo-based polymerization initiator and diethylenetriamine pentaacetic acid satisfying specific content ratio, to obtain hydrogel polymer; and drying, grinding and classifying the hydrogel polymer to form base resin powder.

In order to improve basic absorption properties of super absorbent polymer, various post-treatment processes such as surface crosslinking, foaming, and the like are conducted, or various additives are used, but during such processes, crosslinking density of the polymer is lowered, and thus, sufficient gel strength cannot be realized, and additives, and the like are detached, and thus, when applied for a product, wearing comfort of users is degraded such as occurrence of skin rash, and the like.

Thus, the inventors found out that in case a specific polymerization initiator and chelating agent are used in combination in the crosslinking polymerization step, a novel crosslink structure may be uniformly formed in polymer, without the above-explained problems, and thus, super absorbent polymer having excellent absorption properties and optimum gel strength at the same time can be more productively prepared, and completed the invention.

Hereinafter, a method for preparing super absorbent polymer according to specific embodiments of the invention will be explained in detail according to steps.

(Crosslinking Polymerization Step)

First, the method for preparing super absorbent polymer according to one embodiment of the invention comprises a step of: conducting crosslinking polymerization of water soluble ethylenically unsaturated monomers having acid groups of which at least a part are neutralized and an internal crosslinking agent, in the presence of an azo-based polymerization initiator and diethylenetriamine pentaacetic acid satisfying specific content ratio, to obtain hydrogel polymer.

Wherein, the crosslinking polymerization step may be conducted by crosslinking polymerization of a monomer composition comprising components generally used in the preparation of super absorbent polymer, besides the above-explained components.

First, the crosslinking polymerization is conducted in the presence of an azo-based polymerization initiator, and in addition, a chelating agent of diethylenetriamine pentaacetic acid (DTPA) is used in combination at a specific content ratio, thereby introducing a novel crosslink structure in the polymerization process, and realizing excellent absorption properties and high gel strength of base resin powder at the same time, thus remarkably improving the properties of the finally prepared super absorbent polymer.

Specifically, the azo-based polymerization initiator is a component initiating the crosslinking reaction of monomers, has excellent radical stability, and easily forms polymer of a long chain structure, compared to persulfate-based polymerization initiators. Particularly, when using diethylenetriamine pentaacetic acid in combination, chain transfer by metal may be effectively prevented, thereby forming long and uniform polymer chain, and thus, when practically applied for hygienic products, and the like, excellent absorption properties and gel strength may be simultaneously realized.

The diethylenetriamine pentaacetic acid (DTPA) is a chelating agent, and is used in combination with the above-explained azo-based polymerization initiator to introduce a novel crosslink structure in polymer during the polymerization process, thereby realizing excellent absorption properties and high gel strength of base resin powder at the same time, thus remarkably improving the properties of the finally prepared super absorbent polymer.

Specifically, in case the diethylenetriamine pentaacetic acid is added together with the azo-based polymerization initiator in the polymerization process, five —COOH structures may effectively prevent chain transfer of metal ions during the polymerization process, and thus, it is easy to form a uniform long chain structure, compared to other chelating agents. Particularly, since it is used together in the polymerization process, detachment does not occur.

Particularly, the azo-based polymerization initiator and diethylenetriamine pentaacetic acid are included at the weight ratio of 1:2 to 1:10. By including in the above content range, a novel crosslink structure intended is formed, and thus, excellent absorption properties and high gel strength of base resin powder may be simultaneously realized, and thereby, the properties of the finally prepared super absorbent polymer may be remarkably improved.

Meanwhile, if the weight ratio of the azo-based polymerization initiator and diethylenetriamine pentaacetic acid does not fall within the above explained range, and diethylenetriamine is included in the content less than 2 parts by weight based on 1 part by weight of the azo-based polymerization initiator, it may be difficult to achieve a uniform crosslink structure intended, and for example, if the content of the azo-based polymerization initiator is relatively too large, a chain length in the polymer may become short, and thus, it may be difficult to realize a structure intended. And, if diethylenetriamine is included in the content greater than 10 parts by weight based on 1 part by weight of the azo-based polymerization initiator, additional side reactions may occur, and thus, absorption properties may be deteriorated.

Preferably, the azo-based polymerization initiator and diethylenetriamine pentaacetic acid may be included at the weight ratio of 1:3 to 1:7. In case included at the weight ratio, synergistic effect according to the combination may be maximized.

As specific examples of the azo-based polymerization initiator, one or more selected from the group consisting of 2,2-azobis(2-amidinopropane) dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane] dihydrochloride and 4,4-azobis-(4-cyanovaleric acid) may be mentioned, and preferably, 2,2-azobis(2-amidinopropane) dihydrochloride may be used.

The content of the azo-based polymerization initiator is not specifically limited, but it may be included in the content of 500 ppmw to 1,500 ppmw, preferably 600 ppmw to 900 ppmw or 700 ppmw to 850 ppmw, based on the weight of the water soluble ethylenically unsaturated monomers. It is a very small amount as compared to commonly used polymerization initiators, and in the present disclosure, it is used in combination with the above-explained diethylenetriamine pentaacetic acid, and thus, may realize intended effect even with a very small amount.

The content of the diethylenetriamine pentaacetic acid is not specifically limited, but it may be included in the content of 1,000 ppmw to 10,000 ppmw, preferably 3,000 ppmw to 9,000 ppmw or 3,500 ppmw to 7,500 ppmw, based on the weight of the water soluble ethylenically unsaturated monomers. It is used in combination with the azo-based initiator within the above content range, to realize intended effect.

The water soluble ethylenically unsaturated monomers may be any monomers commonly used in the preparation of super absorbent polymer. As non-limiting examples, the water soluble ethylenically unsaturated monomer may be a compound represented by the following Chemical Formula 1:

$$R_1—COOM^1 \qquad \text{[Chemical Formula 1]}$$

In the Chemical Formula 1, $R_1$ is a C2-5 alkyl group comprising an unsaturated bond, $M^1$ is a hydrogen atom, a monovalent or divalent metal, an ammonium group or an organic amine salt.

Preferably, the monomers may be one or more selected from the group consisting of acrylic acid, methacrylic acid, and monovalent metal salts, divalent metal salts, ammonium salts and organic amine salts thereof. It is favorable that acrylic acid or a salt thereof is used as the water soluble ethylenically unsaturated monomer, because superabsorbent polymer with improved absorption property can be obtained. In addition, as the monomers, one or more selected from the group consisting of anionic monomers and salts thereof, such as maleic anhydride, fumaric acid, crotonic acid, itaconic acid, 2-acryloylethane sulfonic acid, 2-methacryloylethane sulfonic acid, 2-(meth)acryloylpropane sulfonic acid or 2-(meth)acrylamide-2-methylpropane sulfonic acid; non-ionic hydrophilic group-containing monomers, such as (meth)acrylamide, N-substituted (meth)acrylate, 2-hydroxyethyl (meth)acrylate, 2-hydroxypropyl (meth)acrylate, methoxy polyethylene glycol (meth)acrylate or polyethylene glycol (meth)acrylate; amino group-containing unsaturated monomers and quaternized products thereof, such as (N,N)- dimethylaminoethyl (meth)acrylate or (N,N)-dimethylaminopropyl (meth)acrylamide, may be used.

Wherein, the water soluble ethylenically unsaturated monomers have acid groups, and at least a part of the acid groups are partially neutralized using the neutralizing solution of the invention. Preferably, the monomers partially neutralized with alkali material such as sodium hydroxide, potassium hydroxide, ammonium hydroxide, and the like may be used.

Wherein, the degree of neutralization of monomers may be 40 to 95 mol %, or 40 to 80 mol %, or 45 to 75 mol %. Although the range of the neutralization degree may vary according to the final properties, if the neutralization degree is too high, neutralized monomers may be precipitated, and thus, it may be difficult to smoothly progress polymerization, and to the contrary, if the neutralization degree is too low, absorption property of polymer may be significantly lowered, and it may exhibit elastic rubber-like properties, which is difficult to handle.

In the super absorbent polymer of one embodiment, the hydrogel polymer may be polymer formed by crosslinking polymerization of the monomers, in the presence of one or more internal crosslinking agents selected from the group consisting of C8-12 bis(meth)acrylamide, C2-10 polyol poly (meth)acrylate and C2-10 polyol poly(meth)allylether.

As the internal crosslinking agent, any compounds enabling introduction of crosslink during polymerization of the water soluble ethylenically unsaturated monomers may be used. As non-limiting examples, multifunctional crosslinking agent such as N,N'-methylenebisacrylamide, trimethylolpropane tri(meth)acrylate, ethyleneglycol di(meth)acrylate, polyethyleneglycol (meth)acrylate, polyethyleneglycol di(meth)acrylate, propyleneglycol di(meth)acrylate, polypropyleneglycol(meth)acrylate, butanedioldi(meth)acrylate, butyleneglycoldi(meth)acrylate, diethyleneglycol di(meth)acrylate, hexanediol di(meth) acrylate, triethyleneglycol di(meth)acrylate, thipropyleneglycol di(meth)acrylate, tetraethyleneglycol di(meth) acrylate, dipentaerythritol pentaacrylate, glycerin tri(meth) acrylate, pentaerythritol tetraacrylate, triarylamine, ethyleneglycol diglycidyl ether, propylene glycol, glycerin, or ethylene carbonate may be used alone or in combination of two or more kinds, but not limited thereto. Preferably, among them, ethyleneglycol diglycidyl ether may be used.

In the monomer composition, such an internal crosslinking agent may be used in the content of 500 ppmw to 1,500 ppmw, based on the weight of the water soluble ethylenically unsaturated monomers. Thereby, internal crosslinking degree of hydrogel polymer and base resin powder may be controlled, and thus, absorption properties and permeability of super absorbent polymer may be optimized. However, if the content of the internal crosslinking agent is too high, basic absorption properties of super absorbent polymer may be deteriorated.

Besides, in the monomer composition, additives such as a photopolymerization initiator, a blowing agent, a surfactant, a thickener, a plasticizer, a preservation stabilizer, an antioxidant, and the like may be further included.

As the photopolymerization initiator, one or more compounds selected from the group consisting of benzoin ether, dialkyl acetophenone, hydroxyl alkylketone, phenyl glyoxylate, benzyl dimethyl Ketal, acyl phosphine, and α-aminoketone may be used. Among them, as specific examples of acyl phosphine, diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate, and the like may be mentioned. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the content of 10 ppmw to 500 ppmw, preferably 50 ppmw to 300 ppmw or 50 ppmw to 100 ppmw, based on the weight of the water soluble ethylenically unsaturated monomers. If the concentration of the photopolymerization initiator is too low, a polymerization speed may become slow, and remaining monomers may be extracted a lot in the final product. To the contrary, if the concentration of the photopolymerization initiator is higher than the above range, a polymer chain making up a network may become short, and thus, the properties of the polymer may be deteriorated.

And, the monomer composition may be prepared in the form of a solution in which the above-explained raw materials such as monomers, a polymerization initiator, a chelating agent, an internal crosslinking agent, and the like are dissolved in a solvent.

Wherein, a solvent that can be used is not limited as long as it can dissolve or disperse the above explained raw materials, and for example, one or more selected from water, ethanol, ethyleneglycol, diethyleneglycol, tri ethyl enegly col, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

And, the formation of hydrogel polymer through the polymerization of the monomer composition may be conducted by common polymerization methods without specific limitation. As non-limiting examples, the polymerization method is largely classified into thermal polymerization and photopolymerization according to energy source, and thermal polymerization may be progressed in a reactor equipped with a stirring axis such as a kneader, and photopolymerization may be progressed in a reactor equipped with a movable conveyer belt.

For example, hydrogel polymer may be obtained by introducing the above-described monomer composition into a reactor equipped with a stirring axis such as a kneader, and supplying hot air or heating the reactor to progress thermal polymerization. Wherein, the hydrogel polymer discharged to the outlet of the reactor may have a size of a few millimeters to a few centimeters according to the shape of the stirring axis equipped in the reactor. Specifically, the size of obtained hydrogel polymer may vary according to the concentration of the introduced monomer composition and introduction speed, and the like, and commonly, hydrogel polymer with particle diameter of 2 to 50 mm may be obtained.

And, in case photopolymerization of the monomer composition is progressed in a reactor equipped with a movable conveyer belt as explained above, hydrogel polymer in the form of a sheet may be obtained. Wherein, the thickness of the sheet may vary according to the concentration of the introduced monomer composition and introduction speed, and it is preferable that the thickness is controlled to 0.5 to 5 cm so that the entire sheet may be uniformly polymerized, and simultaneously, a production speed may be secured.

The moisture content of hydrogel polymer thus obtained may be commonly 40 to 80 wt %. Throughout the specification, a "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the temperature is raised from room temperature to about 180° C. and then maintained for about for 40 minutes.

(Drying, Grinding and Classification Steps)

Next, the method for preparing super absorbent polymer according to one embodiment of the invention comprises a step of drying, grinding and classifying the prepared hydrogel polymer to form base resin powder.

Specifically, a step of drying the obtained hydrogel polymer is conducted. If necessary, in order to increase the efficiency of the drying step, a step of coarsely grinding (chopping) the hydrogel polymer may be further conducted before drying.

Wherein, the grinder used is not limited, but specifically, one selected from the group consisting of a vertical pulverizer, a turbo cutter, a turbo grinder, a rotary cutter mill, a cutter mill, a disc mill, a shred crusher, a crusher, a chopper and a disc cutter may be used, but not limited thereto.

Wherein, the chopping step may be conducted such that a particle diameter of hydrogel polymer may become 2 mm to 10 mm. Grinding to a particle diameter less than 2 mm would not be technically easy due to the high moisture content of hydrogel polymer, and may generate agglomeration between ground particles. Meanwhile, if ground to a particle diameter greater than 10 mm, the effect of increasing the efficiency of subsequent drying step may be insignificant.

For the hydrogel polymer chopped as explained above, or right after polymerization without chopping, drying is conducted. Wherein, the drying temperature may be 150 to 250° C. If the drying temperature is less than 150° C., the properties of the finally formed super absorbent polymer may be deteriorated, and if the drying temperature is greater than 250° C., only the polymer surface may be dried, and thus, fines may be generated in subsequent grinding process, and the properties of the finally formed super absorbent polymer may be deteriorated. Thus, it is preferable that the drying is progressed at a temperature of 150 to 200° C., more preferably 150 to 190° C.

The drying may be progressed for 20 to 90 minutes considering process efficiency, but the drying time is not limited thereto.

Meanwhile, the drying step may be conducted by a multistage process within the above explained temperature range.

The drying method is not limited as long as it is commonly used as a dying process of hydrogel polymer. Specifically, the drying step may be progressed by hot air supply, infrared irradiation, microwave irradiation, or UV irradiation, and the like. The hot air supply may be conducted by using an oven capable of transferring air volume up and down.

The polymer after progressing such a drying step may have a moisture content of about 0.1 to about 10 wt %.

Next, a step of grinding dried polymer is conducted.

The polymer powder obtained after grinding step may have a particle diameter of 150 to 850 µm. As a grinder used to grind to such a particle diameter, specifically, a pin mill, a hammer mill, a screw mill, a roll mill, a disc mill or a jog mill, and the like may be used, but not limited thereto.

And, in order to manage the properties of super absorbent polymer finally productized after such a grinding step, the polymer powder obtained after grinding may be classified according to particle diameter. Preferably, polymer having a particle diameter of 150 µm to 850 µm may be classified, and only the polymer powders having such a particle diameter may be subjected to a surface crosslinking step and productized. More specifically, base resin powders after classification may have particle diameters of 150 µm to 850 µm, and may comprise particles having particle diameters of 300 µm to 600 µm in the content of 50 wt % or more, and fines having particle diameters less than 150 µm in the content less than 3 wt %.

The base resin powder prepared by the above method may have centrifuge retention capacity (CRC) measured according to EDANA method WSP 241.2, of 45.0 g/g or more, preferably, 45.0 g/g to 48.0 g/g, 46.0 g/g to 47 g/g. Specific measurement method of centrifuge retention capacity will be explained in detail in experimental example later.

The base resin powder prepared by the above method may have gel strength of 0.30 N or more, said gel strength being measured by dipping 2.5 g of the base resin powder in 50 g of a saline solution of ascorbic acid and swelling it in a 40° C. oven for 24 hours, and then, measuring the swollen base resin powder using a tension and compression tester. Wherein the saline solution of ascorbic acid refers to an aqueous solution of 0.9 wt % NaCl and 0.005 wt % ascorbic acid.

The gel strength is an indicator of decomposition resistance to a L-ascorbic acid component included in urine, body fluid, and the like, and specific measurement method of gel strength will be explained in detail in experimental example later.

Preferably, gel strength may be 0.30 N or more, more preferably 0.30 N to 0.50 N. Specific measurement method of gel strength will be explained in detail in experimental example later.

(Surface Crosslinking Step)

Meanwhile, after preparing base resin powder through the above-explained classification process, a step of surface crosslinking the base resin powder while heat treating, in the presence of a surface crosslinking agent, may be further conducted.

The surface crosslinking step induces a crosslinking reaction of the surface of the base resin powder in the presence of a surface crosslinking agent, and the unsaturated bonds of the water soluble ethylenically unsaturated monomers that are not crosslinked and remain on the surface are crosslinked by the surface crosslinking agent, thus forming superabsorbent polymer with increased surface crosslinking density.

Specifically, a surface crosslinked layer may be formed by heat treatment in the presence of a surface crosslinking agent, and the heat treatment process increases surface crosslinking density, namely external crosslinking density, but does not change internal crosslinking density, and thus, super absorbent polymer having a surface crosslink layer has a structure wherein the crosslinking density of the outside is higher than inside.

In the surface crosslinking step, a surface crosslinking composition comprising an alcohol-based solvent and water, in addition to the surface crosslinking agent, may be used.

Meanwhile, as the surface crosslinking agent included in the surface crosslinking composition, those previously used for the preparation of superabsorbent polymer may be used without specific limitations. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2,-methyl-2,4-pentanediol, tripropylene glycol and glycerol; one or more carbonate-based compounds selected from the group consisting of ethylene carbonate and propylene carbonate; epoxy compounds such as ethylene glycol diglycidyl ether, and the like; oxazoline compounds such as oxazolidinone, and the like; polyamine compounds; mono-, di- or polyoxazolidinone compounds; or cyclic urea compounds; and the like. Preferably, those identical to the above explained internal crosslinking agent may be used, and for example, alkylene glycol diglycidyl ether-based compounds such as ethylene glycol diglycidyl ether may be used.

Such a surface crosslinking agent may be used in the amount of 0.001 to 2 parts by weight, based on 100 parts by weight of the base resin powder. Preferably, it may be used in the amount of 0.005 parts by weight or more, 0.01 parts by weight or more, or 0.02 parts by weight or more, and 0.5 parts by weight or less, 0.3 parts by weight or less. By controlling the content of the surface crosslinking agent within the above range, super absorbent polymer exhibiting excellent properties such as absorption performance and permeability can be prepared.

Meanwhile, the surface crosslinking agent is added to the base resin powder in the form of a surface crosslinking composition comprising the same, and a method for adding such a surface crosslinking composition is not specifically limited. For example, the surface crosslinking composition and base resin powder may be put in a reactor and mixed, or the surface crosslinking composition may be sprayed to the base resin powder, or the surface crosslinking composition and base resin powder may be continuously fed to a continuously operated mixer and mixed, and so on.

And, the surface crosslinking composition may further comprise water and/or a hydrophilic organic solvent as a medium. Thereby, the surface crosslinking agent may be uniformly dispersed in the base resin powder. Wherein, the content of water and hydrophilic organic solvent may be controlled based on 100 parts by weight of the base resin powder, so as to induce uniform dissolution/dispersion of the surface crosslinking agent, prevent agglomeration of the base resin, and optimize the surface penetration depth of the surface crosslinking agent.

The surface crosslinking step may be progressed by heat treating at a temperature of 110° C. to 200° C., or 110° C. to 150° C. for more than 30 minutes. More specifically, the surface crosslinking may be progressed by heat treating at the maximum reaction temperature explained above for 30 to 80 minutes, or 40 to 70 minutes.

By meeting these surface crosslinking process conditions (particularly, temperature rise condition and reaction at the maximum reaction temperature), super absorbent polymer meeting excellent properties such as permeability under load can be prepared.

A temperature rise means for the surface crosslinking is not specifically limited, and heat medium may be supplied or heat source may be directly supplied to heat. Wherein, as the heat medium that can be used, steam, hot air, temperature-raised fluid such as hot oil may be used, and the temperature of supplied heat medium may be appropriately selected considering the heat medium, temperature rise means and target temperature. Meanwhile, as the heat source directly supplied, electric heating or gas heating may be mentioned, but is not limited thereto.

Meanwhile, according to the preparation method of super absorbent polymer of one embodiment of the invention, various multivalent metal salts such as aluminum salts such as aluminum sulfate may be further used during surface crosslinking, so as to further improve permeability, and the like. Such multivalent metal salts may be included in the surface crosslink layer of the finally prepared super absorbent polymer.

(Super Absorbent Polymer)

According to one embodiment of the invention, there is provided super absorbent polymer prepared by the above preparation method of super absorbent polymer. The super absorbent polymer prepared by the preparation method of super absorbent polymer of above-explained embodiment may realize excellent absorption properties and optimum gel strength, with optimum crosslinking density.

Hereinafter, the actions and effects of the invention will be explained in detail through specific examples of the invention. However, these examples are presented only as the illustrations of the invention, and the scope of the right of the invention is not determined thereby.

EXAMPLE

Example 1

(Polymerization step) In a 3 L glass container equipped with a stirrer and a thermometer, 500 g of acrylic acid, 1,500 ppmw (based on 100 parts by weight of acrylic acid) of ethylene glycol diglycidyl ether as an internal crosslinking agent, and 80 ppmw (based on 100 parts by weight of acrylic acid) of diphenyl(2,4,6-trimethylbenzoyl)-phosphine oxide as a photoinitiator were added and dissolved, and then, 627 g of 31.5% sodium hydroxide solution was added to prepare an aqueous solution of water-soluble unsaturated monomers (neutralization degree: 70 mol %; solid content: 44.9 wt %). After the temperature of the aqueous solution of water-soluble unsaturated monomers increased due to neutralization heat and became 40° C., the mixed solution was put in a container containing 750 ppmw (based on 100 parts by weight of acrylic acid) of a thermal polymerization initiator 2,2'-azobis-(2-amidinopropane) dihydrochloride and 5,000 ppmw of a chelating agent diethylenetriamine pentaacetic acid (DTPA), and then, irradiated by UV (irradiation dose: 10 mV/cm$^2$) for 1 minute to conduct UV polymerization, thus obtaining a hydrogel polymer sheet.

(Chopping step) The obtained hydrogel polymer sheet was passed through a chopper having a hole size of 16 mm to prepare crumb.

(Drying step) Next, the crumb was dried in an oven capable of transferring air volume up and down. The drying was conducted by multistage, and specifically, it was conducted at 150° C. for 5 minutes, at 150° C. for 8 minutes, at 170° C. for 5 minutes, at 175° C. for 5 minutes, at 180° C. for 5 minutes, and at 160° C. for 5 minutes, using an air flow oven. Through the drying process, base resin powder was obtained.

Examples 2 to 4 and Comparative Examples 1 to 7

Super absorbent polymer was prepared by the same method as Example 1, except using components and contents as described in the following Table 1 in the polymerization step.

Comparative Example 8

(Polymerization step) In a 3 L glass container equipped with a stirrer and a thermometer, 500 g of acrylic acid, 1,500 ppmw (based on 100 parts by weight of acrylic acid) of ethylene glycol diglycidyl ether as an internal crosslinking agent, and 80 ppmw (based on 100 parts by weight of acrylic acid) of diphenyl(2,4,6-trimethylbenzoyl)-phosphine oxide as a photoinitiator were added and dissolved, and then, 627 g of 31.5% sodium hydroxide solution was added to prepare an aqueous solution of water-soluble unsaturated monomers (neutralization degree: 70 mol %; solid content: 44.9 wt %). After the temperature of the aqueous solution of water-soluble unsaturated monomers increased due to neutralization heat and became 40° C., the mixed solution was put in a container containing 750 ppmw (based on 100 parts by weight of acrylic acid) of a thermal polymerization initiator 2,2'-azobis-(2-amidinopropane) dihydrochloride, and then, irradiated by UV (irradiation dose: 10 mV/cm$^2$) for 1 minute to conduct UV polymerization, thus obtaining a hydrogel polymer sheet.

(Chopping step) In a chopper having a hole size of 16 mm, the obtained hydrogel polymer sheet and 3,000 ppmw of a chelating agent diethylenetriamine pentaacetic acid (DTPA) were introduced to prepare crumb.

(Drying step) Next, the crumb was dried in an oven capable of transferring air volume up and down. The drying was conducted by multistage, and specifically, it was conducted at 150° C. for 5 minutes, at 150° C. for 8 minutes, at 170° C. for 5 minutes, at 175° C. for 5 minutes, at 180° C. for 5 minutes, and at 160° C. for 5 minutes, using an air flow oven. Through the drying process, base resin powder was obtained.

TABLE 1

| | Crosslinking polymerization step | | |
| --- | --- | --- | --- |
| | Polymerization initiator (component/ content*) | Chelating agent (component/ content*) | Chopping step Chelating agent (component/ content*) |
| Example 1 | A1/750 | DTPA/5,000 | — |
| Example 2 | A1/1500 | DTPA/5,000 | — |
| Example 3 | A1/1500 | DTPA/3,000 | — |
| Example 4 | A1/500 | DTPA/5,000 | — |
| Comparative Example 1 | A1/750 | EDTA-4Na/5,000 | — |
| Comparative Example 2 | A1/750 | Oxalic acid/5,000 | — |
| Comparative Example 3 | A1/750 | EDTA/5,000 | — |
| Comparative Example 4 | A1/750 | — | — |
| Comparative Example 5 | B1/750 | DTPA/5,000 | — |
| Comparative Example 6 | A1/2000 | DTPA/2000 | — |
| Comparative Example 7 | A1/500 | DTPA/7500 | — |
| Comparative Example 8 | A1/750 | — | DTPA/3,000 |

* ppmw based on the weight of monomers
A1: 2,2-azobis-(2-amidinopropane) dihydrochloride
B1: sodium persulfate(SPS)

Experimental Example

For the super absorbent polymer compositions prepared in Examples and Comparative Examples, properties were evaluated as follows, and the results were shown in the following Table 2.

Unless otherwise indicated, the following property evaluations were progressed at room temperature (25±1° C.), and a saline solution means an aqueous solution of 0.9 wt % sodium chloride (NaCl), and a saline solution of ascorbic acid means an aqueous solution of 0.9 wt % sodium chloride (NaCl) and 0.005 wt % ascorbic acid.

(1) Centrifuge Retention Capacity (CRC, g/g)

Among the base resin powders prepared according to Examples and Comparative Examples, a sample having particle diameter of 150 to 850 μm was taken, and centrifuge retention capacity (CRC) by absorption rate under no load was measured according to European Disposables and Non-wovens Association (EDANA) standard EDANA WSP 241.2.

Specifically, W0 (g) of the sample (about 0.2 g) was uniformly put in an envelope made of non-woven fabric and sealed, and then, dipped in a saline solution (0.9 wt %) at room temperature. After 30 minutes, it was drained under condition of 250 g for 3 minutes using a centrifuge, and the weight W2 (g) of the envelope was measured. And, after the same operation was conducted without using the sample, the weight W1 (g) at that time was measured. Using obtained weight, CRC (g/g) was calculated according to the following Mathematical Formula 1.

$$CRC\ (g/g)=\{[W2\ (g)-W1\ (g)]/W0\ (g)\}-1 \quad \text{[Mathematical Formula 1]}$$

(2) Gel Strength (N)

Among the base resin powders prepared according to Examples and Comparative Examples, a sample having particle diameter of 150 to 8501 m was taken, and 2.5 g of super absorbent polymer was dipped in 50 g of ascorbic acid saline solution, and swollen in a 40° C. oven for 24 hours, and then, gel strength of the swollen base resin powder was measured using a tension and compression tester.

Specifically, the swollen base resin powder was measured using a tension and compression tester, digital force gauge FGP-2, wherein a peak value of a force (N) applied to a tip while the tip penetrated was measured three times under the following conditions, and the arithmetic mean was determined as gel strength (unit: N).

Tip size: terminal diameter 10±0.1 mm
Beaker size: 50±0.1 mm
Penetation speed: 500±0.5 mm/min

TABLE 2

| | Base resin powder | |
| --- | --- | --- |
| | CRC(g/g) | Gel strength(N) |
| Example 1 | 46.3 | 0.31 |
| Example 2 | 46.0 | 0.30 |
| Example 3 | 45.5 | 0.30 |
| Example 4 | 45.0 | 0.30 |
| Comparative Example 1 | 45.4 | 0.25 |
| Comparative Example 2 | 44.9 | 0.26 |
| Comparative Example 3 | 40.9 | 0.32 |
| Comparative Example 4 | 44.0 | 0.18 |
| Comparative Example 5 | 46.5 | 0.18 |
| Comparative Example 6 | 44.2 | 0.21 |
| Comparative Example 7 | 41.1 | 0.28 |
| Comparative Example 8 | 43.8 | 0.19 |

As shown in Table 2, it was confirmed that in case an azo-based polymerization initiator and diethylenetriamine pentaacetic acid are used in combination in the polymeriza-tion step, optimum crosslinking density of polymer can be realized, and thus, excellent absorption properties and gel strength of base resin powder can be simultaneously realized. Thus, the properties of the finally prepared super absorbent polymer may be remarkably improved.

In the case of Comparative Examples wherein DTPA was not used, or a sulfate-based polymerization initiator was used instead of an azo-based polymerization initiator, gel strength was remarkably lowered, compared to Examples. It was confirmed that in case other chelating agents are used instead of DTPA, it was difficult to simultaneously realize intended degrees of gel strength and centrifuge retention capacity.

In the case of Comparative Examples 6 and 7 wherein the content ratio of an azo-based polymerization initiator and diethylenetriamine pentaacetic acid does not fall within the range of the invention, it was difficult to form a uniform and long chain structure, and thus, it was difficult to simultaneously realize excellent absorption properties and gel strength.

In the case of Comparative Example 8 wherein diethylenetriamine pentaacetic acid was included in the chopping step after polymerization instead of in the polymerization step, gel strength was remarkably lowered, compared to Examples.

The invention claimed is:

1. A method for preparing a super absorbent polymer comprising:

conducting crosslinking polymerization of water soluble ethylenically unsaturated monomers having acid groups at least a part of which are neutralized with an internal crosslinking agent, in the presence of an azo-based polymerization initiator and diethylenetriamine pentaacetic acid, to obtain a hydrogel polymer; and drying, grinding and classifying the hydrogel polymer to form base resin powder, wherein the azo-based polymerization initiator and the diethylenetriamine pentaacetic acid are included at a weight ratio of 1:2 to 1:10, wherein the base resin powder has a centrifuge retention capacity (CRC) measured according to EDENA method WSP 241.2, of 45.0 g/g or more and wherein gel strength measured using tension and compression tester is 0.30 N or more, said gel strength being measured by dipping 2.5 g of the base resin powder in 50 g of a saline solution of ascorbic acid and swelling the base resin powder in a 40° C. oven for 24 hours, and then, measuring the swollen base resin powder.

2. The method for preparing super absorbent polymer according to claim 1, wherein the azo-based polymerization initiator and the diethylenetriamine pentaacetic acid are included at the weight ratio of 1:3 to 1:7.

3. The method for preparing super absorbent polymer according to claim 1, wherein the azo-based polymerization initiator is included in a content of 500 ppmw to 1,500 ppmw based on a total weight of the water soluble ethylenically unsaturated monomers.

4. The method for preparing super absorbent polymer according to claim 1, wherein the diethylenetriamine pentaacetic acid is included in a content of 1,000 ppmw to 5,000 ppmw based on a total weight of the water soluble ethylenically unsaturated monomers.

5. The method for preparing super absorbent polymer according to claim 1, wherein the azo-based polymerization initiator comprises one or more selected from the group consisting of 2,2-azobis(2-amidinopropane) dihydrochloride, 2,2-azobis-(N,N-dimethylene)isobutyramidine dihydrochloride, 2-(carbamoylazo)isobutyronitrile, 2,2-azobis [2-(2-imidazolin-2-yl)propane] dihydrochloride and 4,4-azobis-(4-cyanovaleric acid).

6. The method for preparing super absorbent polymer according to claim 1, wherein the internal crosslinking agent comprises one or more selected from the group consisting of N,N'-methylenebisacrylamide, trimethylolpropane tri(meth) acrylate, ethyleneglycol di(meth)acrylate, polyethylenegly-col (meth)acrylate, polyethyleneglycol di(meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth) acrylate, tripropyleneglycol di(meth)acrylate, tetraethyl-eneglycol di(meth)acrylate, dipentaerythritol pentaacrylate, glycerin tri(meth)acrylate, pentaerythritol tetraacrylate, tri-arylamine, ethyleneglycol diglycidyl ether, propyleneglycol, glycerin, and ethylene carbonate.

7. The method for preparing super absorbent polymer according to claim 1, wherein the internal crosslinking agent is included in a content of 500 ppmw to 1,500 ppmw based on a total weight of the water soluble ethylenically unsatu-rated monomers.

*     *     *     *     *